United States Patent

[11] 3,604,728

| [72] | Inventors | Blass Symcha;<br>Ishajahu Blass, both of 26 Manch St., Tel Aviv, Israel |
|---|---|---|
| [21] | Appl. No. | 861,123 |
| [22] | Filed | Sept. 25, 1969 |
| [45] | Patented | Sept. 14, 1971 |
| [32] | Priority | Jan. 3, 1969 |
| [33] | | Australia |
| [31] | | 48630/69 |

[54] DRIP LEVEL IRRIGATION
4 Claims, 4 Drawing Figs.

[52] U.S. Cl. ..................................................... 285/14,
61/12
[51] Int. Cl. ...................................................... F16l 55/00
[50] Field of Search............................................ 137/512;
285/5, 6, 14, 15, 396, 401, 402, 399; 61/10, 11, 12, 13

[56] References Cited
UNITED STATES PATENTS

| 1,128,634 | 2/1915 | Talbot.......................... | 285/402 X |
| 2,024,901 | 12/1935 | Wrigley........................ | 285/14 |
| 2,660,457 | 11/1953 | Mallon.......................... | 285/402 X |
| 2,981,072 | 4/1961 | Brewington.................. | 285/13 X |
| 3,359,013 | 12/1967 | Knox et al.................... | 285/13 |

FOREIGN PATENTS

| 711,138 | 6/1965 | Canada......................... | 285/13 |

*Primary Examiner*—Dave W. Arola
*Attorney*—Arthur B. Colvin

ABSTRACT: An irrigation dripper unit for use in irrigation in association with an irrigation supply pipe and also, when combined with a supply pipe, to form together with the supply pipe an integral unit. The dripper unit can be connected in series with the supply pipe or, when constituting a part of the integral unit, is connected in series with the supply pipe and has means to tap off a portion of the water flowing through the unit and to discharge such portion at a low drip rate.

PATENTED SEP 14 1971 3,604,728
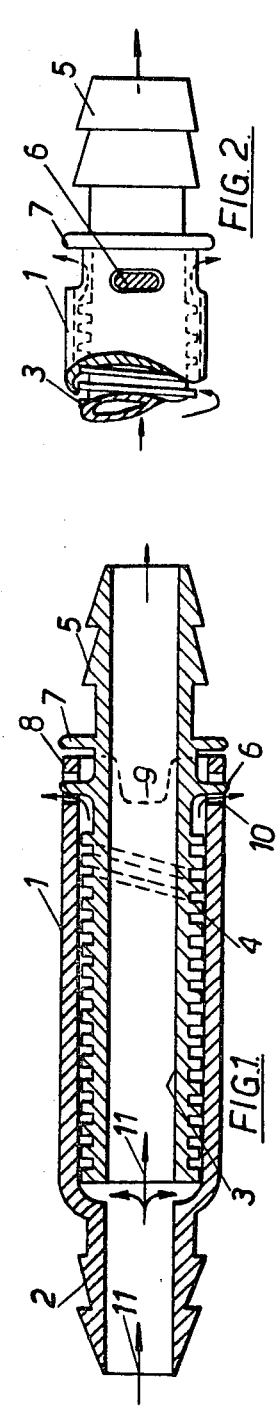
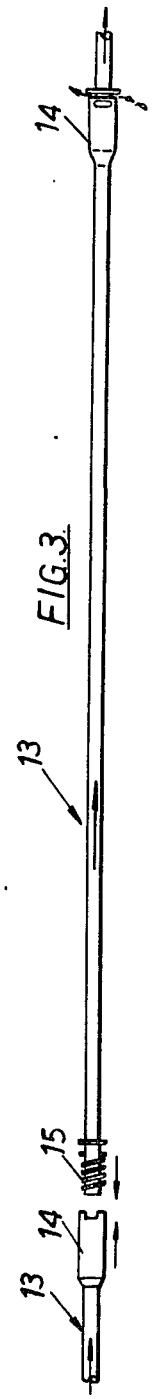
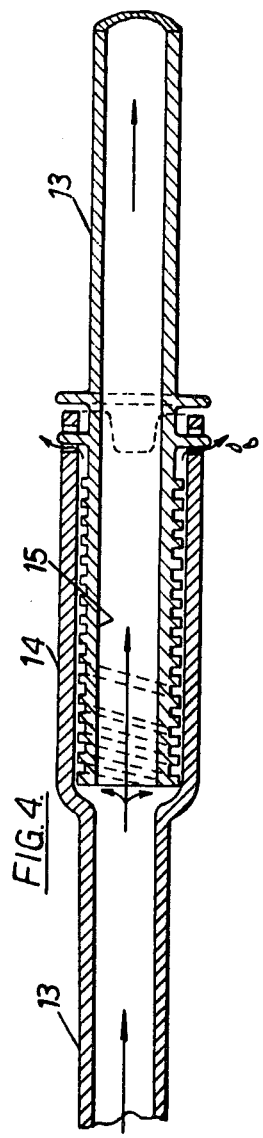
Inventor
SYMCHA BLASS
JSCHAJAHU BLASS
By
Attorney

DRIP LEVEL IRRIGATION

This invention relates to an irrigation dripper unit for use in irrigation in association with an irrigation supply pipe and also to a combined irrigation unit and supply pipe. The invention relates particularly to a dripper unit which can be connected in series with the supply, or, constituting an integral portion of the supply pipe, is connected in series therewith, and has means to tap off a portion of the water flowing through the unit and to discharge such portion at a low drip rate.

It is an object of one aspect of the present invention to provide a new and improved form of irrigation dripper unit.

It is an object of a further aspect of the present invention to provide a new form of combined supply pipe and irrigation dripper unit.

According to one aspect of the present invention there is provided an irrigation dripper unit to connect adjacent pipeline sections comprising an outer tubular member, an inner tubular member fitting within the outer tubular member, one pair of opposite end portions of the inner and outer tubular members projecting beyond the other pair of opposite end portions of the outer and inner tubular members respectively for connection to adjacent pipeline sections, a continuous elongated helical groove formed in the surface of one of the tubular members and defining a continuous conduit with respect to the contiguous surface of the other tubular member, one end of said conduit adjacent the projecting end of the outer tubular member and defining an inlet, at least one port defining an outlet formed in said unit for flexibly connecting said tubular members together.

According to a further aspect of the present invention there is provided a combined pipeline section and irrigation dripper unit comprising a pipeline section an outer tubular member formed integrally with one end of the pipeline section, an inner tubular member formed integrally with the other end of the pipeline section, the inner tubular member associated with one pipeline section being adapted to fit within the outer tubular member associated with the succeeding pipeline section so as to constitute an irrigation dripper unit, a continuous elongated helical groove formed in the surface of one of the tubular members of the unit and defining a continuous conduit with respect to the contiguous surface of the other tubular member, one end of said conduit communicating with an adjacent pipe section and defining an inlet, at least one part defining an outlet formed in said unit adjacent to and communicating with the opposite end of the conduit and flexible connecting means formed in said unit for flexibly connecting said tubular members together.

The invention will now be described by way of example and with reference to the accompanying drawings in which:

FIG. 1 is a longitudinal sectional view of an irrigation dripper unit in accordance with the invention;

FIG. 2 is a side elevation of a detail of the dripper unit shown in FIG. 1;

FIG. 3 is a side elevation of a combined pipeline section and irrigation dripper unit; and FIG. 4 is a cross-sectional view of a detail of the combination shown in FIG. 3.

In the embodiment shown in FIGS. 1 and 2 of the drawings, the dripper unit is formed of an outer tubular casing 1, which is open at one end and whose other end s formed integrally with a connecting portion 2 adapted to be connected to an adjacent portion of the pipeline section. Fitting tightly into this outer tubular casing 1 is an inner tubular member 3 which has formed on its outer surface a spiral groove 4. The end of the inner tubular member 3 opposite that end which is designed to be introduced into the outer tubular casing 1 is formed as a serrated connecting end 5 adapted to be connected to the succeeding pipeline section. Adjacent this end the inner tubular member 3 is provided with a pair of outwardly projecting lugs 6 formed integrally with the outer wall thereof and, spaced apart therefrom, in a direction towards the end of the serrated connecting portion 2, is an integrally formed flange or shoulder 7.

The rim 8 of the open end of the outer tubular casing 1 is provided with a pair of rectangular incisions 9 separated from each other by a pair of elongated slots 10. The two tubular components 1 and 3 of the dripper unit are assembled and held in position with the tubular member 3 being inserted into the outer tubular casing 1 so that its lugs 6 are located within the two slots 10 and in this position the two tubular components are twisted with respect to each other by 45° as a result of which the flexible casing material is sufficiently distorted to allow for the lugs 6 to enter the incisions 9 and so as to form a flexible bayonetlike connection.

Water flowing through the pipeline section provided with such dripper units has a portion thereof diverted so as to pass in the direction of the arrows 11, through the spiral flow duct defined between the spiral groove 4 and the inner wall of the casing 1, so as to emerge as a practically pressureless drip through the incisions 9.

The embodiment just described and shown in FIGS. 1 and 2 is capable of ready disassembly when it is required to be cleaned or replaced.

FIG. 3 shows a combined pipeline section and dripper unit. As seen in the drawing a pipeline section 13 is formed integrally at one end with a tubular casing 14 which is identical in construction with the outer tubular casing 1 described with reference to FIG. 1 of the drawings. The other end of the pipeline section 13 is formed integrally with a spirally grooved tubular member 15 which is of identical construction to that of the tubular member 3 described with reference to FIG. 1 of the drawings. As can be seen in FIG. 3 and in detail in FIG. 4, the tubular member of one unit 13 is inserted into the tubular casing 14 of the adjacent unit 13 and retained by means of the bayonet or other flexible coupling.

We claim:

1. An irrigation dripper unit to connect adjacent pipeline sections, comprising an outer tubular member and an inner tubular member, each having first and second opposite end portions, said inner tubular member being axially slidable into said outer tubular member, means retaining said inner tubular member within the outer tubular member, the first end portion of the outer tubular member being disposed adjacent and projecting beyond the second end portion of the inner tubular member, the first end portion of the inner tubular member being disposed adjacent and projecting beyond the second end portion of the outer tubular member, said first end portions of said tubular members serving to connect adjacent pipeline sections, a continuous elongated helical groove formed in the surface of one of the tubular members and defining a continuous conduit with respect to the contiguous surface of the other tubular member, one end of said helical conduit being disposed adjacent the second end portion of the inner tubular member and defining an inlet communicating with the interior of said inner tubular member, at least one port defining an outlet formed in said unit adjacent to and communicating with the opposite end of the helical conduit and the exterior of said unit whereby said conduit defines a continuously open path to the exterior of the unit, for flow of a portion of the fluid that may be flowing through the interior of said inner tubular member.

2. An irrigation dripper unit according to claim 1 and furthermore comprising pipeline sections respectively formed integrally with said first end portions of said tubular members.

3. A combined pipeline section and irrigation dripper unit comprising a pipeline section, an outer tubular member, a first end portion of said outer tubular member being formed integrally with one end of the pipeline section, an inner tubular member, a first end portion of the inner tubular member being formed integrally with the other end of the pipeline section, a continuous elongated helical groove formed in the surface of one of the tubular members of the unit, said inner tubular member being axially slidable into said outer tubular member, means retaining the inner tubular member associated with one pipeline section within the outer tubular member associated with a succeeding pipeline section so as to constitute an irrigation dripper unit, contiguous surfaces of the two tubular members defining between them a continuous elongated helical conduit, one end of said conduit communicating with an adjacent pipe secton and defining an inlet and at least one port defining an outlet formed in said unit adjacent to and communicating with the opposite end of the conduit and the exterior of said unit whereby said conduit defines a continuously open path to the exterior of the unit, for flow of a portion of the fluid that may be flowing through the interior of said inner tubular member.

4. A combination according to claim 3 wherein said connecting means is formed of alternating recesses and slots formed peripherally in the second end portion of the outer tubular member and projections formed in corresponding positions of the inner tubular members.